United States Patent [19]
Navarre et al.

[11] Patent Number: 5,965,091
[45] Date of Patent: Oct. 12, 1999

[54] FILLED PAPER FOR GAS FILTRATION

[75] Inventors: Francois-Pierre Navarre, Charbonniere les Bains; Bernard Bossand, Communay; Pierre Girard, Saint Ismier; Joseph Dussaud, Pont-Eveque, all of France

[73] Assignees: Elf Antar France, Courbevoie; Ahlstrom, Vitry sur Seine Cedex, both of France

[21] Appl. No.: 08/988,064

[22] Filed: Dec. 10, 1997

[30] Foreign Application Priority Data

Dec. 12, 1996 [FR] France ................................. 96 15295

[51] Int. Cl.$^6$ ....................................................... A61L 9/00
[52] U.S. Cl. ............................ 422/122; 422/4; 422/120; 422/900; 55/524; 55/527; 55/528; 96/223; 210/502.1; 210/505; 210/508; 210/509; 210/501
[58] Field of Search ................................. 422/4, 120, 122, 422/900; 55/524, 527, 528; 96/223; 210/502.1, 505, 508, 509, 501

[56] References Cited

U.S. PATENT DOCUMENTS

| | | | |
|---|---|---|---|
| 4,988,440 | 1/1991 | Bernard et al. | 210/504 |
| 5,202,296 | 4/1993 | Osborne | 502/158 |
| 5,352,274 | 10/1994 | Blakley | 95/90 |

FOREIGN PATENT DOCUMENTS 0 207 588   1/1987   European Pat. Off. .

*Primary Examiner*—Robert Warden
*Assistant Examiner*—Fariborz Moazzam
*Attorney, Agent, or Firm*—Oblon, Spivak, McClelland, Maier & Neustadt, P.C.

[57] ABSTRACT

The present invention relates to a filled paper for gas filtration, with a high adsorption and absorption capacity. This paper, consisting of cellulose fibers, is filled with organic and/or inorganic powders adapted in quantity and in quality to the gas to be treated.

It finds its application in the petroleum, chemical, agri-foodstuffs and papermaking industries, in apartment buildings and in office and hospital buildings.

16 Claims, No Drawings

FILLED PAPER FOR GAS FILTRATION

TECHNICAL FIELD

The present invention relates to a paper for gas filtration which has a high air permeability and high adsorption and absorption capacities.

It finds its application for the filtration and the purification of gas in general and of air in particular, especially in the treatment of wastes from many industries, in the motor vehicle, the home, the hotel industry, catering, office buildings, hospitals and public sites. The paper of the invention makes it possible to remove, inexpensively, solid particles, undesirable liquid vapours, microorganisms and pathogenic agents in suspension in the gases which are treated.

STATE OF THE PRIOR ART

Filter papers are commonly employed as filter media for the filtration and purification of gases. The known papers have the disadvantage of exhibiting a low air permeability which, in the case of a given flow rate of gas to be treated by means of a given area of paper, is reflected in a high pressure drop, which must be compensated by a gas overpressure to ensure its movement. In the case of large gas volumes this results in a high running cost.

Another solution consists in increasing the paper area, and this results in a larger dimensioning of the equipment and hence in high capital costs and large bulk.

According to the known techniques it is necessary to employ papers of low weight per unit area of 15 to 50 g/m$^2$ and to superpose several sheets to compensate the effects of the large dimensions of the free spaces between the fibres, which can reach 200 microns. This technique is employed especially for the manufacture of dust vacuum-cleaner filters. These papers of low weight per unit area have to be treated chemically in order to have sufficient mechanical strength for this type of application. The cost of manufacture of these papers is high.

In addition, since they are employed as thin sheets, all the known filter papers have adsorption and absorption capacities which are very low and generally insufficient to enable chemical or catalytic reactions, which are indispensable to the purification of some suspensions, to take place during the period of flow of the gases through the sheets.

Another known filtration technique consists in passing the gases to be treated through powders such as active carbons placed in stationary beds. These powders become laden with contaminant and, as they become laden, they lose their effectiveness. When they are saturated, they must be regenerated. The plants which make it possible to ensure the operations of the adsorption-desorption cycle are costly. Furthermore the yield and the selectivity of the powders decrease with each cycle.

DESCRIPTION OF THE INVENTION

The aim of the invention is precisely to remedy these disadvantages. To this end it proposes a paper for gas filtration exhibiting a high air permeability and a high adsorption and absorption capacity, based on cellulose fibres, characterized in that it additionally comprises at least one pulverulent organic matter, 95% of the particles of which have a particle size of between 1 and 150 microns, in a proportion of between 5 and 75% of the weight of the paper including the said organic matter.

According to another characteristic of the invention the organic matter includes a micronized active carbon of particle size of between 5 and 50 microns in a proportion which is preferably between 5 and 70% of the weight of the paper including the said organic matter.

According to another characteristic of the invention the active carbon consists of at least one micronized coke chosen from coal cokes, petroleum cokes and lignite cokes.

According to another characteristic of the invention the organic matter includes a micronized roasted wood of particle size of between 50 and 150 microns.

According to another characteristic of the invention the organic matter includes a coniferous wood powder.

According to another characteristic the paper of the invention additionally comprises at least one inorganic material in a proportion of 0.2 to 70% of the weight of the paper including the said organic matter and the said inorganic material.

According to another characteristic of the invention the inorganic material is a product derived from silica, in powder form.

According to another characteristic of the invention the inorganic material is a product derived from alumina, in powder form.

According to another characteristic of the invention the inorganic material is a pulverulent catalyst of particle size of between 2 and 100 microns.

According to another characteristic the paper of the invention additionally comprises a bactericidal agent.

According to another characteristic the paper of the invention additionally comprises a viricidal agent.

According to another characteristic the paper of the invention has undergone a treatment to make it oleophilic.

According to another characteristic the paper of the invention has undergone a treatment to make it water-repellent.

According to another characteristic of the invention the filled paper is employed for filtering and purifying gases.

According to another characteristic of the invention the filled paper is employed for filtering and purifying an internal combustion engine exhaust gas.

According to another characteristic of the invention the filled paper is employed for filtering and purifying building ventilation air.

According to another characteristic of the invention the filled paper is employed for filtering and purifying kitchen polluted air.

According to another characteristic of the invention the filled paper is employed for filtering and purifying ventilation air of a road vehicle.

Other characteristics and advantages of the invention will be seen better on reading the detailed description and the examples which are to follow.

DETAILED DESCRIPTION OF THE INVENTION

The subject-matter of the invention is a paper filled with powders and intended to filter and purify gases. The paper of the invention is produced from cellulose fibres to which powders are added. The medium thus obtained has a high air permeability and absorption and adsorption properties related to the nature of the powders.

This result is illustrated by the following tables:

TABLE 1

|  | UNITS | TEST REFERENCES | | |
|---|---|---|---|---|
|  |  | V1<br>CF = 100% | V2<br>CF = 80%<br>CC = 20% | V3<br>CF = 60%<br>CC = 40% |
| WEIGHT/UNIT AREA | g/m$^3$ | 163 | 155 | 160 |
| AIR PERMEABILITY | ml/min | 350 | 1400 | 2800 |
| DV/V1 | in % |  | +300 | +700 |

TABLE 2

|  | UNITS | TEST REFERENCES | | |
|---|---|---|---|---|
|  |  | V4<br>CF = 60%<br>CC = 20%<br>VF = 10%<br>Ck = 10% | V5<br>CF = 80%<br>VF = 20% | V6<br>CF = 69.5%<br>VF = 20.0%<br>Ck = 11.5% |
| WEIGHT/UNIT AREA | g/m$^3$ | 157 | 249 | 263 |
| AIR PERMEABILITY | ml/min | 2450 | 900 | 1100 |
| DV/V1 | in % | +600 | 160 | 215 |

TABLE 3

|  | UNITS | TEST REFERENCES | |
|---|---|---|---|
|  |  | V7<br>CF = 60%<br>VF = 40% | V8<br>CF = 60%<br>VF = 15%<br>Ck = 10%<br>AC = 10%<br>CL = 5% |
| WEIGHT/UNIT AREA | g/m$^3$ | 248 | 205 |
| AIR PERMEABILITY | ml/min | 1200 | 1350 |
| DV/V1 | in % | 242 | 285 |

In which:
V1, V2, V3, V4, V5, V6, V7 and V8 are variants of the paper composition
CF means cellulose fibres.
CC means catalytic cracker spent catalyst.
VF means vegetable filler (spruce powder of particle size of between 100 and 150 microns).
Ck means coal coke of particle size smaller than 160 microns.
CL means charcoal
AC means active carbon
DV/V1 means the increase in air permeability for each test relative to the test V1.

The air permeability is measured by means of a Bendtsen instrument in accordance with NF Standard Q 03.076; it represents the ability of the paper to allow air to pass through it.

Since the weight per unit area is substantially the same, a relative increase of 700% in air permeability is observed, which is considerable.

These results show that the paper of the invention is a filter material whose characteristics can be adapted to the gas to be filtered by modifying its composition in quality and in quantity.

The paper of the invention can be employed as filter medium with known devices making use of known processes. Belt filters with unwinding paper may be mentioned by way of example.

According to another characteristic of the invention the organic matter filler of the filter paper includes at least one active carbon of particle size of between 5 and 50 microns.

By way of example there may be mentioned active carbons obtained in ovens from vegetable materials such as coconut, olive stones and cork. These active carbons are micronized and preferably represent 5 to 70% of the weight of the cellulose fibres.

The small diameters of the pores of these materials, of between 1 and 40 Å, give the paper a high adsorbency.

The paper filled with active carbon powder is particularly suited to the filtration of gases lightly laden with harmful and/or odorant vapours and/or gases. It has the advantage of retaining aromatic hydrocarbons, especially benzene.

In addition, the paper filled with active carbons has a compressibility coefficient of the order of 0.3, which enables it to withstand large variations in pressure.

Powdered cokes may be advantageously employed for filling the paper because of their low cost; they are, for example, powdered cork burnt by forest fires.

Filter papers which have similar properties are obtained by being filled with roasted and micronized wood powders.

According to another characteristic of the invention the filter paper is filled with agents which modify its pH, for example alumina sulphate, sulphuric acid and ion exchange resins.

According to another characteristic of the invention inorganic pulverulent matter derived from silica, such as silicates, natural silica or crystalline silicoaluminates, is added to the cellulose fibres for treating gases which require ion exchange capacities or high adsorption and absorption capacities.

According to another characteristic of the invention the paper is filled with spent catalyst from a catalytic cracker, which has a specific surface of 10 m$^2$/g and a porosity of 0.5 cm$^3$/g and whose particle size characteristics are the following:

| CATALYST PARTICLE SIZE IN MICRONS | PROPORTIONS IN VOLUME % |
|---|---|
| 0 – 40 | 10 |
| 40 – 80 | 55 |
| 80 –105 | 20 |
| 105 –150 | 10 |
| >150 | 5 |

An advantageous special feature of a catalyst of this type is that it has pores of mean radius of the order of 20 nanometers, which are real traps for molecules.

The filter paper filled with catalytic cracker catalyst also has the advantage of standing up well to processing temperatures of the order of 100° C., of being endowed with oleophilic properties which make it a good coalescer for oils and of having a good mechanical strength.

Another characteristic of the invention is that the filled paper can be treated in a known manner to make it oil-repellent, oleophilic or fire-resistant in order to adapt it to the gas to be filtered.

Depending on requirements, the powder-filled paper may also comprise bactericidal and/or viricidal agents. These agents can be introduced during the manufacture of the paper or at the time of use, by adsorption of bactericidal products like formalin and isotiasolidine or by chemical grafting. Paper of this type finds a particular advantage for the filtration of conditioning air in workshops, clean rooms, office buildings and hospitals. After use the laden papers are destroyed by burning, and this prevents any risk of contamination.

One of the chief advantages of the invention is the ability to employ a filter paper whose characteristics are appropriate to each application, by choosing natural or synthetic cellulose fibre and the best-suited powder(s).

This advantage of the invention can be appreciated better by reading the following examples.

EXAMPLE 1

Filtration of Conditioning Air

A ventilated or air-conditioned room occupied by personnel requires fresh air circulation at a rate of the order of 5 l/s per occupant and of 7 l/s per occupant who is a smoker or who is engaged in average physical activity. The renewed air generally carries dust which is between 1 and a few tens of nanometers in size. This dust accumulates in the ducts on the supports and grids of the air outlets and constitutes niches which promote the development of pathogenic germs which are dangerous to human health.

The filled filter paper best-suited for this application has the following composition:
70% of fibres obtained from raw or bleached coniferous wood
30% of vegetable organic powders of particle size of between 100 and 150 microns.

The permeability of this filled paper is 1000 ml/min, that is approximately 200 times higher than that of a conventional paper.

It can be employed as filter medium with conventional equipment.

EXAMPLE 2

Filtration and Purification of Kitchen Air Before Discharge to the Outside or Before Recycling In this application the objective is to bind fatty vapours and to deodorize the air.

The filled filter paper best-suited to this application has the following composition:
50% of fibres obtained from bleached cellulose fibres,
25% of silica alumina inorganic powders of particle size of between 5 and 100 microns.
25% of vegetable organic powders of particle size of between 20 and 150 microns.

The permeability of this filled paper is 1100 ml/min, that is approximately 3.1 times higher than that of a conventional paper.

It can be employed as a filter medium with conventional hoods.

EXAMPLE 3

Filtration of Air Supply for Vehicle Ventilation

The objective is to retain the dust and to bind the unburnt hydrocarbons present in polluted town air.

The filled filter paper best-suited to this application has the following composition:
60% of fibres obtained from raw fibres
20% of vegetable powders originating from conifers, of particle size of between 50 and 150 microns,
20% of inorganic powders of particle size of between 5 and 150 microns.

The permeability of this filled paper is 2500 ml/min, that is approximately 7 times higher than that of a conventional paper.

It can be employed as a filter medium with conventional cartridges which are changed at the same time as the other filters in the vehicle.

EXAMPLE 4

Filtration of the Effluents From Hydrocarbon Storage Tanks

For this application the filled paper of the invention is employed as filter medium in a cartridge placed at the breathers of storage vessels for products such as gasolines and jet fuels which are a source of olfactive nuisances.

The filled filter paper best-suited to this application has the following composition:
60% of fibres obtained from recovered wastepaper
30% of coal coke powder of particle size of between 50 and 100 microns,
10% of active carbon powder of particle size of between 1 and 20 microns.

The permeability of this filled paper is 2600 ml/min, that is approximately 7.4 times higher than that of a conventional paper.

EXAMPLE 5

Cleaning of Service Station Areas to Improve the Environment.

For this application the filled paper of the invention is employed as an absorber for hydrocarbons around regions for dispensing diesel fuel, petrol and other fuels.

For this application the paper must be fire-resistant and antistatic.

The filled filter paper best-suited to this application has the following composition:
40% of raw fibres
10% of recycled fibres
20% of products imparting fire resistance, consisting of one third of ammonium phosphate, one third of ammonium sulphonate and one third of ammonium sulphate
30% of vegetable powders of particle size between 100 and 150 microns.

The permeability of this filled paper is 700 ml/min, that is approximately twice that of a conventional paper.

We claim:

1. A filled paper for gas filtration, comprising:
a paper formed of cellulose fibers impregnated with at least one pulverulent organic material, 95% of the particles of the pulverulent material having a particle size ranging from 1– 150 $\mu$m, in an amount of 5–75% by weight based on the combined weight of cellulose fibers and pulverulent material, said pulverulent material comprising at least one particulate material selected from the group consisting of micronized roasted wood particles having a particle size ranging from 50–150 $\mu$m and a coniferous wood powder.

2. The filled paper of claim 1, which further comprises from 0.2–70 wt. %, based on the total weight of the paper, of inorganic material.

3. The filled paper of claim 2, wherein said inorganic material is a powdered product derived from silicate.

4. The filled paper of claim 2, wherein said inorganic material is a powdered product derived from alumina.

5. The filled paper of claim 2, wherein the inorganic material is a pulverulent catalyst having a particle size ranging from 2–100 $\mu$m.

6. The filled paper of claim 1, wherein the paper further comprises a bactericidal agent.

7. The filled paper of claim 1, wherein the paper further comprises a viricidal agent.

8. The filled paper of claim 1, wherein the paper has undergone a treatment to render it oleophilic.

9. The filled paper of claim 1, wherein the paper has been treated to render it water-repellent.

10. The filled paper of claim 1, wherein the organic material is a vegetable material.

11. The filled paper of claim 1, wherein the vegetable material is coconut, olive stones or cork.

12. A method of filtering and purifying gases, comprising:
filtering a gas through the filter paper of claim 1.

13. The method of claim 12, wherein said gas is the exhaust gas from an internal combustion engine.

14. The method of claim 12, wherein said gas is building ventilation air.

15. The method of claim 12, wherein said gas is polluted kitchen air.

16. The method of claim 12, wherein said gas is air for the ventilation of road vehicles.

* * * * *